(12) United States Patent
Chiu et al.

(10) Patent No.: US 8,336,416 B2
(45) Date of Patent: Dec. 25, 2012

(54) BALL SCREW DEVICE HAVING COOLING STRUCTURE

(75) Inventors: Yueh-Ling Chiu, Taichung (TW); Xin-He Chen, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 476 days.

(21) Appl. No.: 12/655,448

(22) Filed: Dec. 30, 2009

(65) Prior Publication Data
US 2011/0154924 A1 Jun. 30, 2011

(51) Int. Cl.
*F16H 1/02* (2006.01)

(52) U.S. Cl. ......... 74/424.87; 74/89.4; 138/89; 138/90

(58) Field of Classification Search ............ 74/424.42, 74/0.81, 0.82, 0.86, 0.87, 89.4; 165/75, 138, 165/145, 163; 138/89, 90
See application file for complete search history.

(56) References Cited

U.S. PATENT DOCUMENTS

| 1,058,210 | A | * | 4/1913 | Welch | 29/522.1 |
| 3,333,723 | A | * | 8/1967 | Wisman | 220/235 |
| 4,050,848 | A | * | 9/1977 | White | 416/146 A |
| 4,494,670 | A | * | 1/1985 | Barone | 220/235 |
| 6,817,260 | B2 | | 11/2004 | Liao | |
| 2002/0152822 | A1 | * | 10/2002 | Chuo | 74/89.13 |
| 2003/0089187 | A1 | * | 5/2003 | Liao | 74/424.81 |
| 2011/0048146 | A1 | * | 3/2011 | Ou et al. | 74/89.23 |

* cited by examiner

*Primary Examiner* — Troy Chambers
*Assistant Examiner* — Valentin Craciun
(74) *Attorney, Agent, or Firm* — Charles E. Baxley

(57) ABSTRACT

A ball screw device includes a ball nut having a bore for receiving a screw shaft, and having a number of longitudinal channels and compartments for forming a zigzag shaped fluid flowing passage in the ball nut, a number of deflecting members engaged with the compartments of the ball nut and each having a recess for communicating adjacent channels with each other, the outer peripheral surfaces of the deflecting members are tilted relative to the ball nut for allowing the deflecting members to be expanded when the deflecting members are expanded, a cooling agent flows through the zigzag shaped fluid flowing passage for cooling the ball nut and for preventing the ball nut from being overheated.

1 Claim, 5 Drawing Sheets

BALL SCREW DEVICE HAVING COOLING STRUCTURE

BACKGROUND OF THE INVENTION

1. Field of the Invention

The present invention relates to a ball screw device, and more particularly to a ball screw device including a cooling structure for suitably cooling the ball nut and for preventing the ball nut from being overheated when the elongated screw shaft is rotated in a great speed relative to the ball nut.

2. Description of the Prior Art

Typical ball screw devices comprise two movable members, such as an elongated screw shaft and a ball nut, rotatable or movable relative to each other, and a number of ball bearing elements disposed between the two movable members for facilitating the sliding movement between the two movable members and/or for allowing the two movable members to be moved or rotated relative to each other in a great rotational speed.

A great heat may be generated between the two movable members or the ball nut and the elongated screw shaft when the two movable members are moved or rotated relative to each other in a great rotational speed, and a cooling structure is thus required to be provided or formed in the ball nut or the elongated screw shaft for suitably cooling the ball nut or the elongated screw shaft, and for preventing the ball nut or the elongated screw shaft from being overheated when the elongated screw shaft is rotated in a great speed relative to the ball nut.

For example, U.S. Pat. No. 6,817,260 to Liao discloses one of the typical ball screw devices comprising a ball nut pivotally or rotatably coupled onto a screw shaft, and a helically running threaded channel provided between the screw shaft and the ball nut for receiving a number of loaded ball bearing elements and for facilitating the sliding or rotating movement between the screw shaft and the ball nut and for allowing the screw shaft and the ball nut to be moved or rotated relative to each other in a great rotational speed, and a cooling structure is formed in the typical ball screw device and includes a peripheral cavity formed between an outer cover and the ball nut as a pathway for cooling agent so as to deprive the ball nut of generated heat therein.

However, the outer cover may not be solidly attached or secured onto the ball nut, and a water tight seal may not be formed between the outer cover and the ball nut such that the cooling agent received in the peripheral cavity that is formed between the outer cover and the ball nut may have a good chance to be leaked or flown out of the outer cover and the ball nut.

The present invention has arisen to mitigate and/or obviate the afore-described disadvantages of the conventional ball screw devices.

SUMMARY OF THE INVENTION

The primary objective of the present invention is to provide a ball screw device including cooling structure for suitably cooling the ball nut and for preventing the ball nut from being overheated when the elongated screw shaft is rotated in a great speed relative to the ball nut.

In accordance with one aspect of the invention, there is provided a ball screw device comprising a ball nut including a bore formed therein, and including a helical groove formed therein, and including a number of channels longitudinally formed therein and offset from the helical groove of the ball nut for receiving a cooling agent therein, and offset from each other, and including a number of compartments formed in two end portions of the ball nut respectively and communicative with every two adjacent channels of the ball nut for forming a zigzag shaped fluid flowing passage in the ball nut, and including an inlet port for receiving the cooling agent, and including an outlet port for allowing the cooling agent to flow out of the fluid flowing passage of the ball nut, and including an inner contact surface and an inner peripheral surface for defining each of the compartments of the ball nut, a number of deflecting members engaged with the compartments of the ball nut respectively and each including an inner surface for engaging with the inner contact surface of the ball nut, and each including an outer peripheral surface and an outer portion, and each including a recess formed therein for communicating every two adjacent channels of the ball nut with each other and for forming the zigzag shaped fluid flowing passage in the ball nut, the outer peripheral surface of the deflecting members being tilted relative to the inner peripheral surface of the ball nut for allowing the deflecting members to be expanded and for allowing the outer peripheral surface of the deflecting members to be gradually engaged with the inner peripheral surface of the ball nut when the deflecting members are expanded, two ring members attached to the end portions of the ball nut respectively and contacted and engaged with the outer portions of the deflecting members for retaining the deflecting members in the compartments of the ball nut respectively, and two covers attached to the end portions of the ball nut respectively and engaged with the ring members for retaining and securing the ring members to the ball nut, the cooling agent may flow through the zigzag shaped fluid flowing passage in the ball nut for suitably cooling the ball nut and for preventing the ball nut from being overheated when the elongated screw shaft is rotated in a great speed relative to the ball nut.

The covers are contacted or engaged with the ring members and preferably secured to the end portions of the ball nut respectively with fasteners for stably or solidly retaining or securing the ring members to the ball nut.

One of the two ring members includes two orifices formed therein and aligned with the inlet and the outlet ports of the ball nut respectively for coupling to a cooling mechanism or facility and for allowing the cooling agent to flow into and out of the fluid flowing passage of the ball nut.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
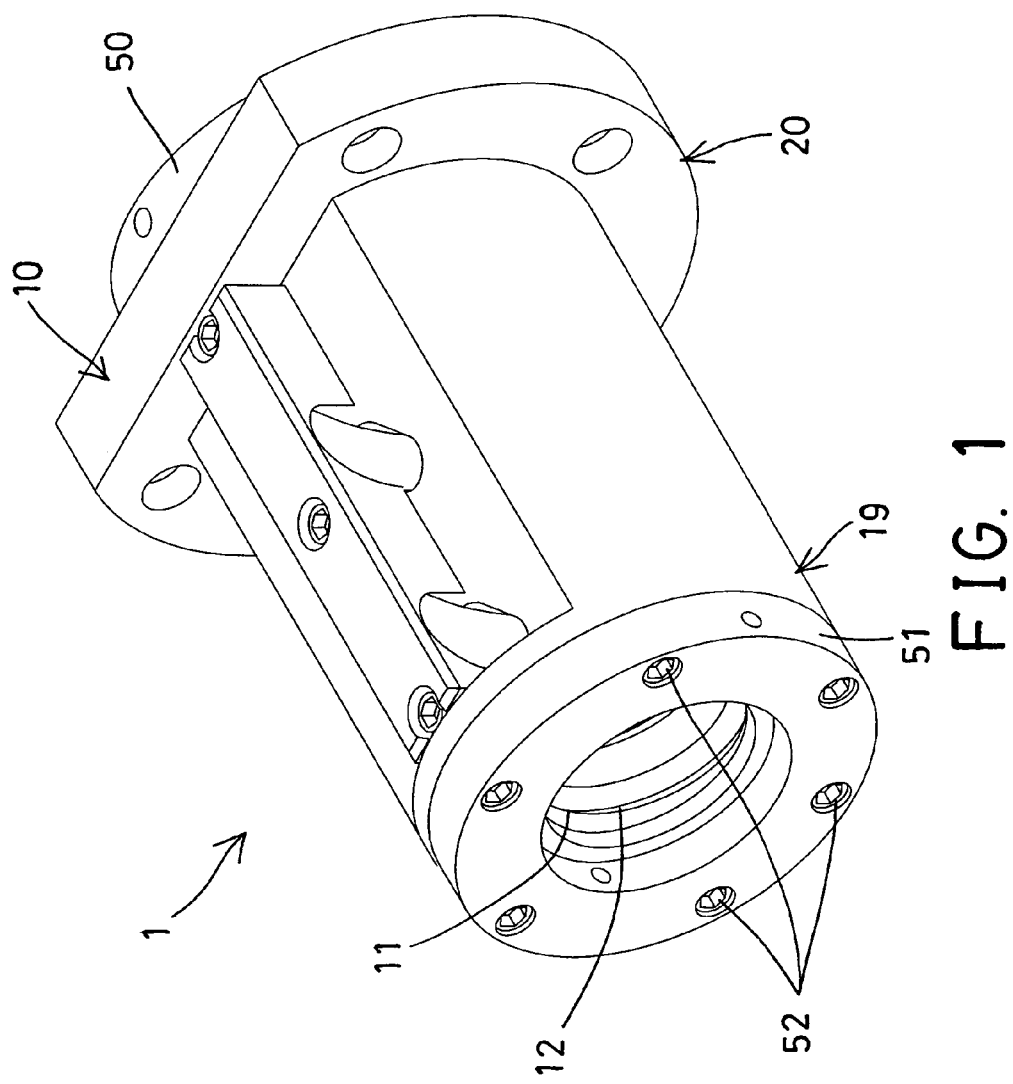
FIG. 1 is a perspective view of a ball nut of a ball screw device in accordance with the present invention.

Referring to the drawings, and initially to FIGS. 1-5, a ball screw device 1 in accordance with the present invention comprises a ball nut 10 including a screw hole or bore 11 formed therein for receiving or engaging with the elongated screw shaft (not shown), and the screw hole or bore 11 of the ball nut 10 is formed or defined by a number of helical threaded portions or grooves 12 for threading or engaging or aligning with the helical threaded portions or grooves (not shown) of the screw shaft and for forming an endless multiple-turn, helical raceway or ball guiding passage (not shown) between the screw shaft and the ball nut 10, and for slidably receiving a number of rollers or ball bearing elements (not shown) and for facilitating the sliding or rotational movement between the screw shaft and the ball nut 10. The above-described structure including the screw shaft and the ball guiding passage and the ball bearing elements is typical and will not be described in further details.

The ball nut 10 includes a number of channels 13, 14, 15, such as an inlet channel 13, an outlet channel 14 and one or more intermediate channels 15 longitudinally or axially formed in the outer peripheral portion thereof, and offset or separated from the helical threaded portions or grooves 12 of the ball nut 10, and offset or separated from each other, and preferably but not necessarily equally spaced from each other, and includes a number of depressions or compartments 16, 17, 18 formed therein, such as formed in the two side or end portions 19, 20 of the ball nut 10 respectively, and arranged and intersected or communicated with the channels 13-15 of the ball nut 10 respectively.

Figure 3:
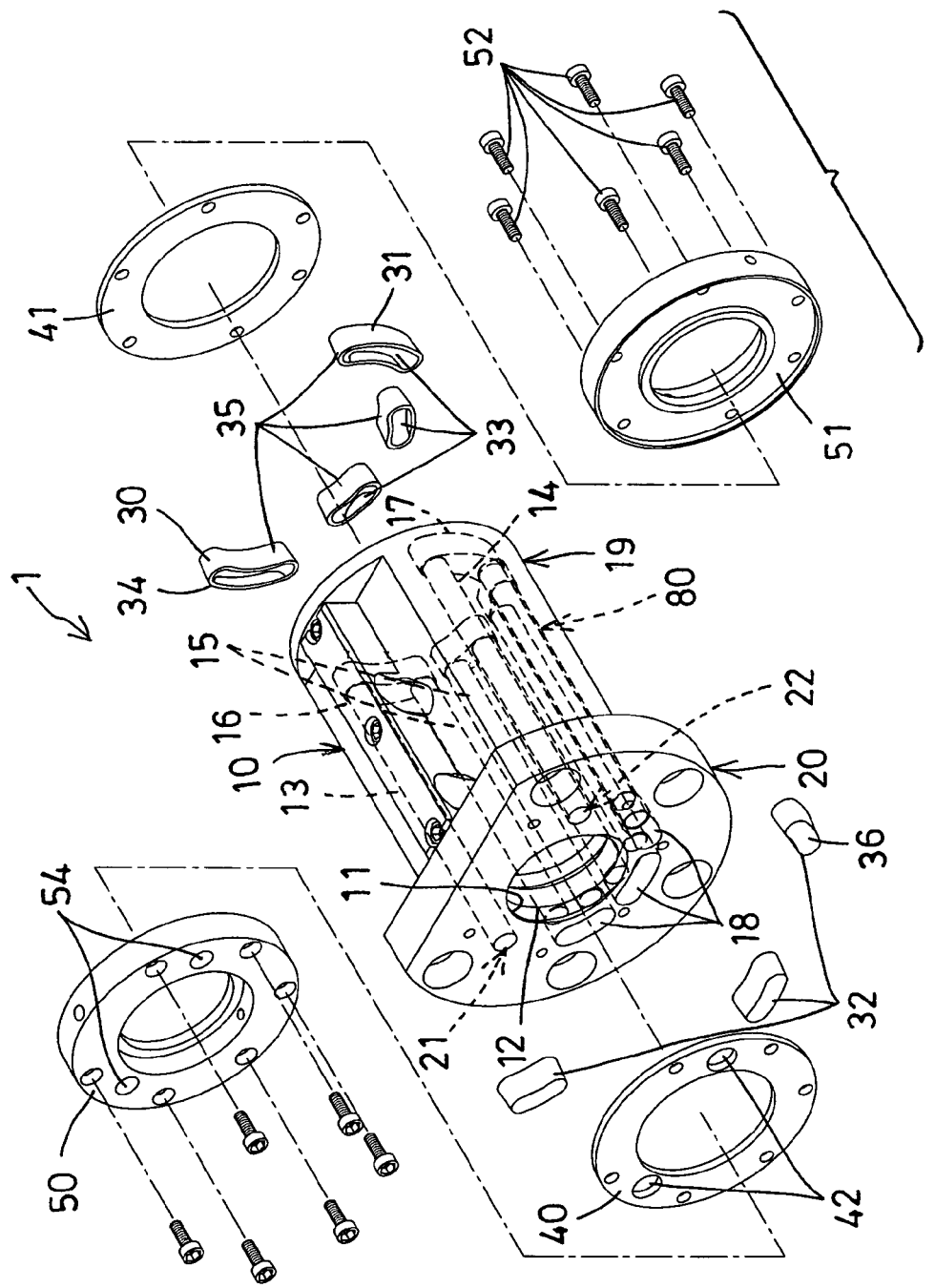
FIG. 3 is another partial exploded view of the ball screw device as seen from the opposite or different direction as that shown in FIG. 2.

For example, as shown in FIG. 3, one of the depressions or compartments 16 is communicative with the inlet channel 13 and an adjacent intermediate channel 15 of the ball nut 10, the other depression or compartment 17 is communicative with the outlet channel 14 and an adjacent intermediate channel 15 of the ball nut 10, and the further intermediate depressions or compartments 18 are communicative with every two adjacent intermediate channels 15 of the ball nut 10 for forming or defining a zigzag shaped fluid flowing passage 80 that includes a number of C or U-shaped fluid flowing conduits and that is provided for receiving a heat or cold or cooling fluid or agent or medium therein, and that includes an inlet opening or port 21 for receiving cooling agent, and an outlet opening or port 22 for allowing the cooling agent to flow out of the fluid flowing passage 80 of the ball nut 10.

A number of plugs or gaskets or sealing and/or deflecting members 30, 31, 32 are engaged with or engaged into the compartments 16-18 of the ball nut 10 respectively, for example, one of the sealing or deflecting members 30 is engaged into the first compartment 16 of the ball nut 10, the other sealing or deflecting members 31 is engaged into the second compartment 17 of the ball nut 10, and the further sealing or deflecting members 32 are engaged into the further compartments 18 of the ball nut 10 respectively, and the deflecting members 30-32 each include a recess 33 formed therein for communicating every two adjacent intermediate channels 13-15 of the ball nut 10 with each other and for forming or defining the returning portions of the zigzag shaped fluid flowing passage 80 in the ball nut 10.

Figure 2:
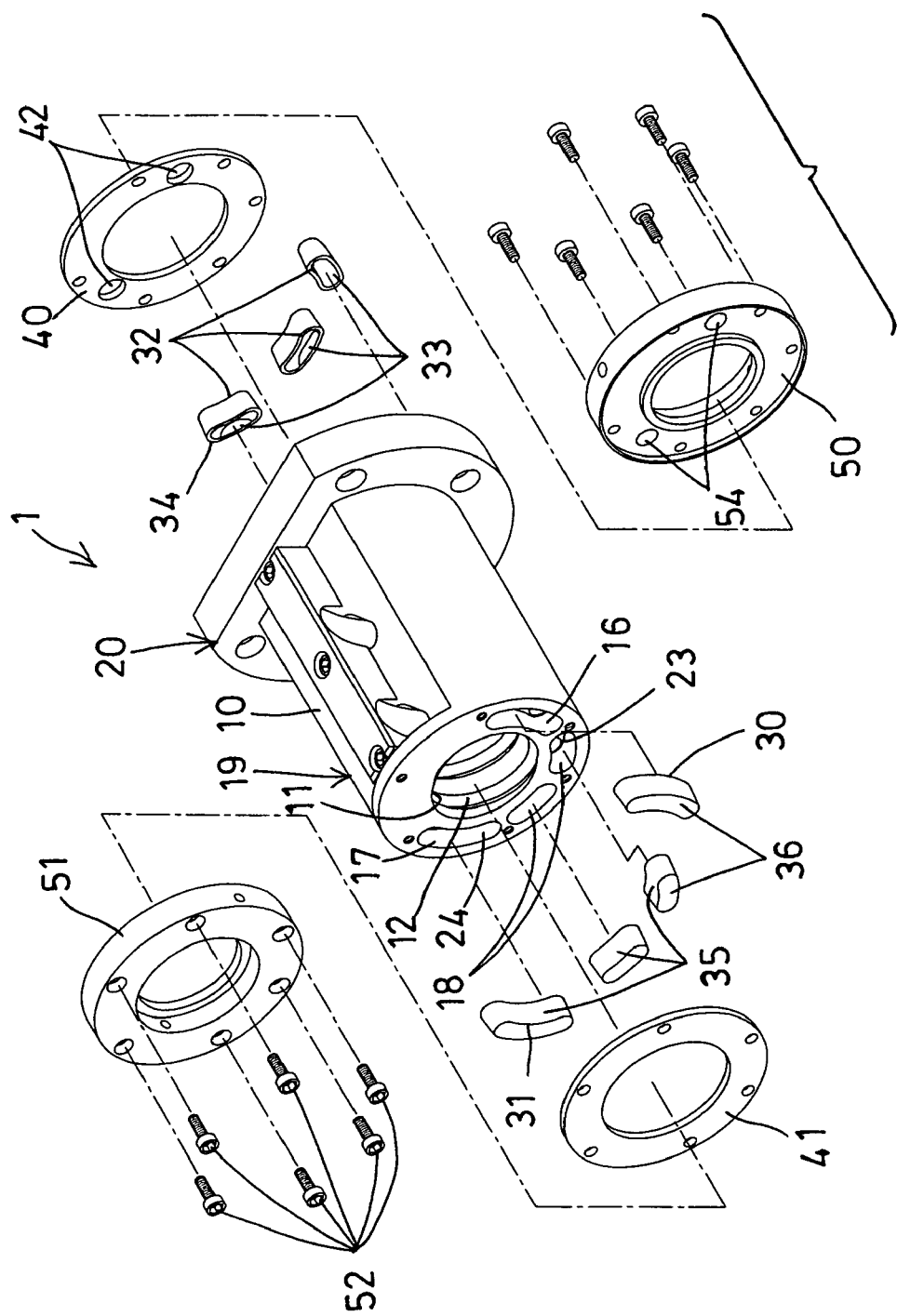
FIG. 2 is a partial exploded view of the ball screw device.
Figure 5:
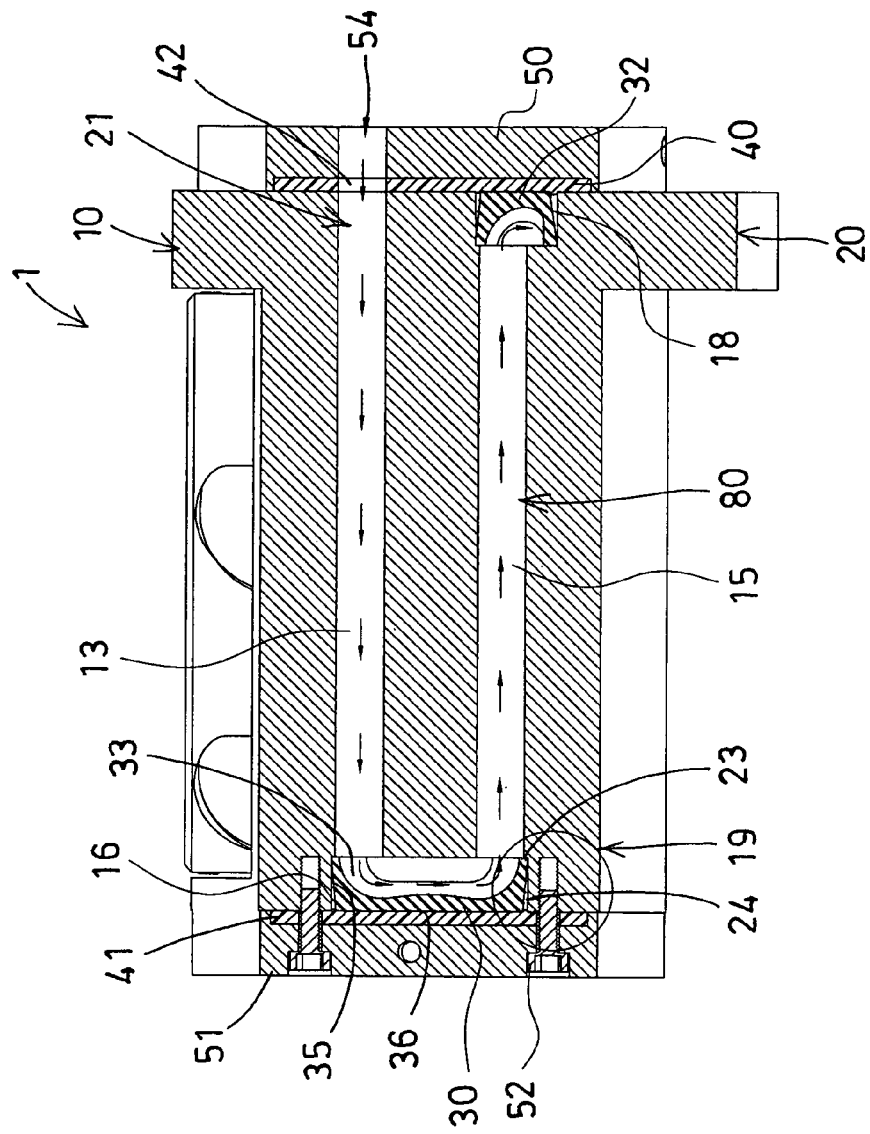
FIG. 5 is a cross sectional view of the ball screw device taken along lines 5-5 of FIG. 1.
Figure 6:
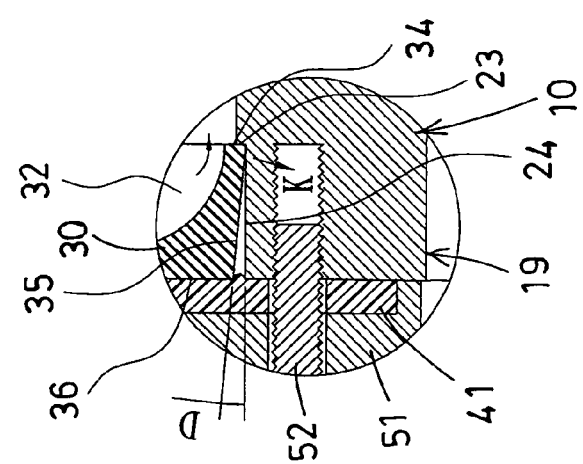
FIG. 6 is an enlarged partial cross sectional view of the ball screw device as shown in FIG. 5.

As shown in FIGS. 2 and 5-6, the ball nut 10 includes an inner flat or contact surface 23 and a curved or inner peripheral surface 24 provided therein for forming or defining each of the compartments 16-18 of the ball nut 10 respectively, and the deflecting members 30-32 each include an inner flat surface 34 for engaging with the inner contact surface 23 of the ball nut 10, and a tapered or inclined outer peripheral surface 35 provided thereon. As best shown in FIG. 6, the outer peripheral surface 35 of the deflecting members 30-32 is tapered or inclined relative to the inner peripheral surface 24 of the ball nut 10 for a selected or predetermined included angle D for allowing the deflecting members 30-32 to be suitably expanded as indicated by the arrow K and for allowing the outer peripheral surface 35 of the deflecting members 30-32 to be gradually contacted or engaged with the inner peripheral surface 24 of the ball nut 10 in order to gradually increase the contact area between the deflecting members 30-32 and the ball nut 10.

Two gaskets or washers or ring members 40, 41 are attached or mounted or secured to or contacted or engaged with the two side or end portions 19, 20 of the ball nut 10 respectively for blocking or closing or sealing the compartments 16-18 of the ball nut 10 respectively, and also contacted or engaged with the outer portions 36 of the deflecting members 30-32 (FIGS. 5, 6) for stably or solidly retaining the deflecting members 30-32 in the compartments 16-18 of the ball nut 10 respectively, and two covers 50, 51 are also attached or mounted or secured to the two side or end portions 19, 20 of the ball nut 10 respectively with latches or fasteners 52 and also contacted or engaged with the ring members 40, 41 for stably or solidly retaining or securing the ring members 40, 41 to the ball nut 10.

One of the ring members 40 includes two orifices 42 formed therein and aligned with the inlet and the outlet opening or ports 21, 22 of the ball nut 10 respectively for allowing the cooling agent to flow into and out of the fluid flowing passage 80 of the ball nut 10, and one of the covers 50 includes two apertures 54 formed therein and aligned with the orifices 42 of the ring members 40, 41 respectively for coupling to a cooling mechanism or facility (not shown) and for allowing the cooling agent to flow through the orifices 42 of the ring members 40, 41 and then to flow into and out of the fluid flowing passage 80 of the ball nut 10 and thus for allowing the cooling agent to suitably cool the ball nut 10 and to prevent the ball nut 10 from being overheated.

Figure 4:
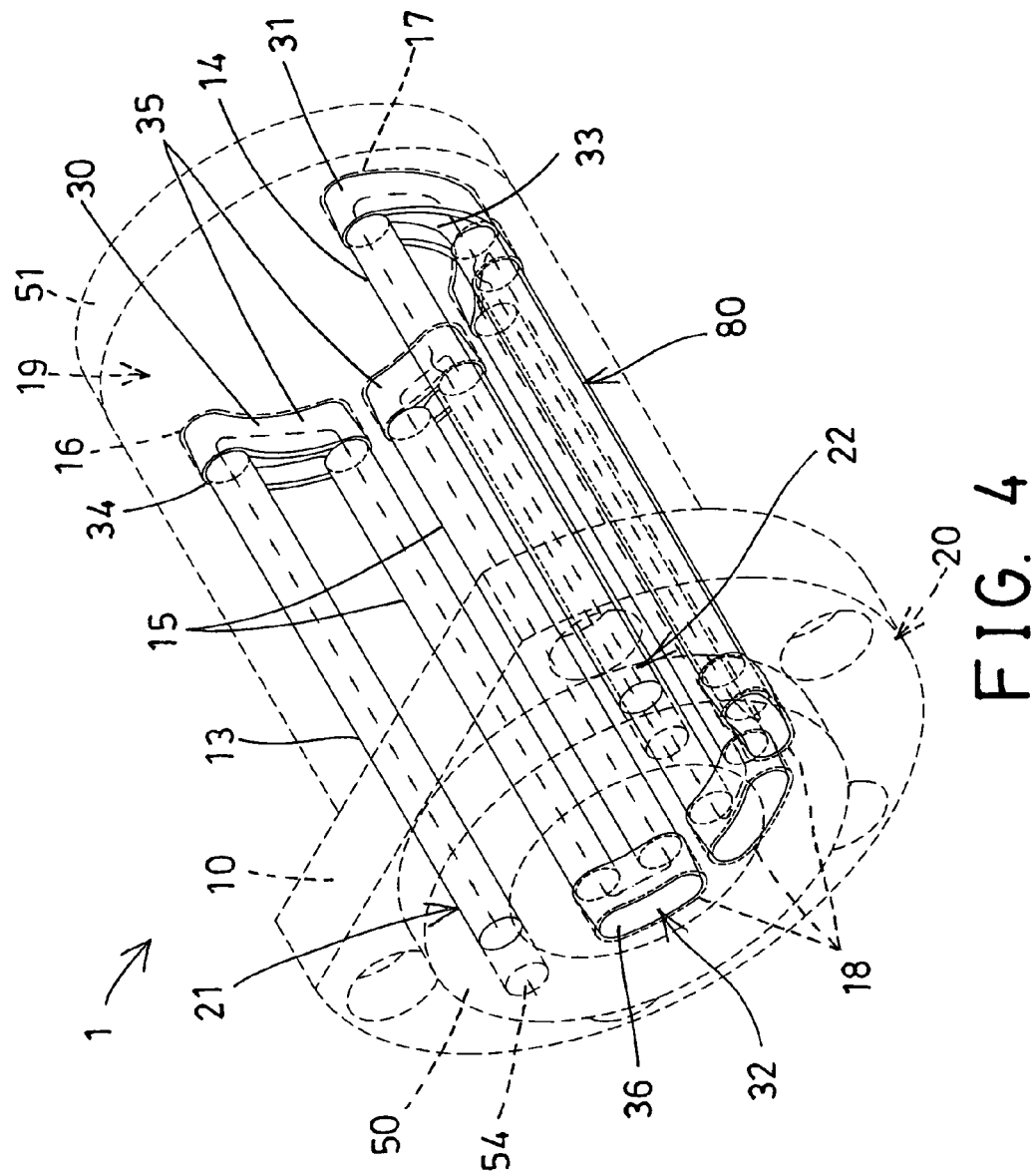
FIG. 4 is a partial perspective view of the ball screw device.

In operation, as shown in FIGS. 4 and 5, the cooling agent may flow through one of the apertures 54 and one of the orifices 42 of the covers 50 and of the ring members 40 respectively for allowing the cooling agent to flow through the cover 50 and the ring member 40 and then to flow into the inlet opening or port 21 of the fluid flowing passage 80 of the ball nut 10, and then to flow through the channels 13-15 of the ball nut 10 and the recesses 33 of the deflecting members 30-32 respectively, and then to flow out through the outlet opening or port 22 in order to suitably cool the ball nut 10 and to prevent the ball nut 10 from being overheated.

It is to be noted that the cooling agent may strike or force onto the deflecting members 30-32 respectively and may suitably expand the deflecting members 30-32 in the direction as indicated by the arrow K for allowing the outer peripheral surface 35 of the deflecting members 30-32 to be gradually contacted or engaged with the inner peripheral surface 24 of the ball nut 10 in order to gradually increase the contact area between the deflecting members 30-32 and the ball nut 10, and may force the deflecting members 30-32 onto the ring members 40, 41 respectively for allowing a suitable fluid seal to be formed between the deflecting members 30-32 and the ball nut 10, and for preventing the cooling agent from leaking or flowing out of the ball nut 10.

Accordingly, the ball screw device in accordance with the present invention includes cooling structure for suitably cooling the ball nut and for preventing the ball nut from being overheated when the elongated screw shaft is rotated in a great speed relative to the ball nut.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:
1. A ball screw device comprising:
a ball nut including a bore formed therein, and including a helical groove formed therein, and including a plurality of channels longitudinally formed therein and offset from said helical groove of said ball nut for receiving a cooling agent therein, and offset from each other, and including a plurality of compartments formed in two end portions of said ball nut respectively and communicative with every two adjacent channels of said ball nut for forming a zigzag shaped fluid flowing passage in said ball nut, and including an inlet port for receiving the cooling agent, and including an outlet port for allowing the cooling agent to flow out of said fluid flowing passage of said ball nut, and including an inner contact surface and an inner peripheral surface for defining each of said compartments of said ball nut,
a plurality of deflecting members engaged with said compartments of said ball nut respectively and each including an inner surface for engaging with said inner contact surface of said ball nut, and each including an outer peripheral surface and an outer portion, and each including a recess formed therein for communicating every two adjacent channels of said ball nut with each other and for forming said zigzag shaped fluid flowing passage in said ball nut, said outer peripheral surface of said deflecting members being tilted relative to said inner peripheral surface of said ball nut for allowing said deflecting members to be expanded and for allowing said outer peripheral surface of said deflecting members to be gradually engaged with said inner peripheral surface of said ball nut when said deflecting members are expanded,
a first ring member and a second ring member attached to said end portions of said ball nut respectively and contacted and engaged with said outer portions of said deflecting members for retaining said deflecting members in said compartments of said ball nut respectively, said first ring member including two orifices formed therein and aligned with said inlet and said outlet ports of said ball nut respectively for allowing the cooling agent to flow into and out of said fluid flowing passage of said ball nut, and
two covers attached and secured to said end portions of said ball nut with fasteners respectively and engaged with said first and said second ring members for retaining and securing said first and said second ring members to said ball nut.

\* \* \* \* \*